(12) United States Patent
Shoji et al.

(10) Patent No.: US 9,015,735 B2
(45) Date of Patent: Apr. 21, 2015

(54) DISK-SHAPED INFORMATION RECORDING MEDIUM, DISK CARTRIDGE, AND INFORMATION RECORDING/REPRODUCING APPARATUS

(71) Applicant: Panasonic Intellectual Property Management Co., Ltd., Osaka-shi, Osaka (JP)

(72) Inventors: Mamoru Shoji, Osaka (JP); Shuji Tabuchi, Okayama (JP); Yoshihiro Kawasaki, Osaka (JP); Hidemi Isomura, Okayama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/556,234

(22) Filed: Dec. 1, 2014

(65) Prior Publication Data

US 2015/0089516 A1   Mar. 26, 2015

Related U.S. Application Data

(63) Continuation of application No. 13/960,814, filed on Aug. 7, 2013, now Pat. No. 8,930,974.

(30) Foreign Application Priority Data

Aug. 9, 2012 (JP) ................................. 2012-177029
Jun. 27, 2013 (JP) ................................. 2013-135367

(51) Int. Cl.
*G11B 7/24047* (2013.01)
*G11B 33/04* (2006.01)
*G11B 7/24* (2013.01)

(52) U.S. Cl.
CPC ........ *G11B 7/24047* (2013.01); *G11B 33/0438* (2013.01); *G11B 2007/240012* (2013.01)

(58) Field of Classification Search
USPC .......................................................... 720/718
See application file for complete search history.

(56) References Cited

U.S. PATENT DOCUMENTS 6,961,951 B2 * 11/2005 Usami ........................... 720/718
7,305,690 B2 * 12/2007 Usami ........................... 720/718

FOREIGN PATENT DOCUMENTS

| JP | H01-103022 U | 7/1989 |
| JP | H03-230381 A | 10/1991 |
| JP | H05-198015 A | 8/1993 |

OTHER PUBLICATIONS

Office Action from the parent U.S. Appl. No. 13/960,814 issued on May 30, 2014.

* cited by examiner

*Primary Examiner* — Mark Blouin
(74) *Attorney, Agent, or Firm* — Shinjyu Global IP

(57) ABSTRACT

The disk-shaped information recording medium having an outer diameter and an inner diameter comprises a substrate having a predetermined thickness, a first side that is one side of the substrate, a second side that is the other side of the substrate, a cylindrical portion forming a through hole formed at a center of the substrate, and a thin portion formed so as to surround an outer diameter of the cylindrical portion. The thin portion is thinner than the predetermined thickness and includes a non-inclined surface and an inclined surface formed on an outer diameter side of the non-inclined surface. The inclined surface is inclined at an angle greater than or equal to 25 degrees and less than or equal to 35 degrees with respect to the non-inclined surface.

12 Claims, 15 Drawing Sheets

INNER DIAMETER SIDE                    OUTER DIAMETER SIDE

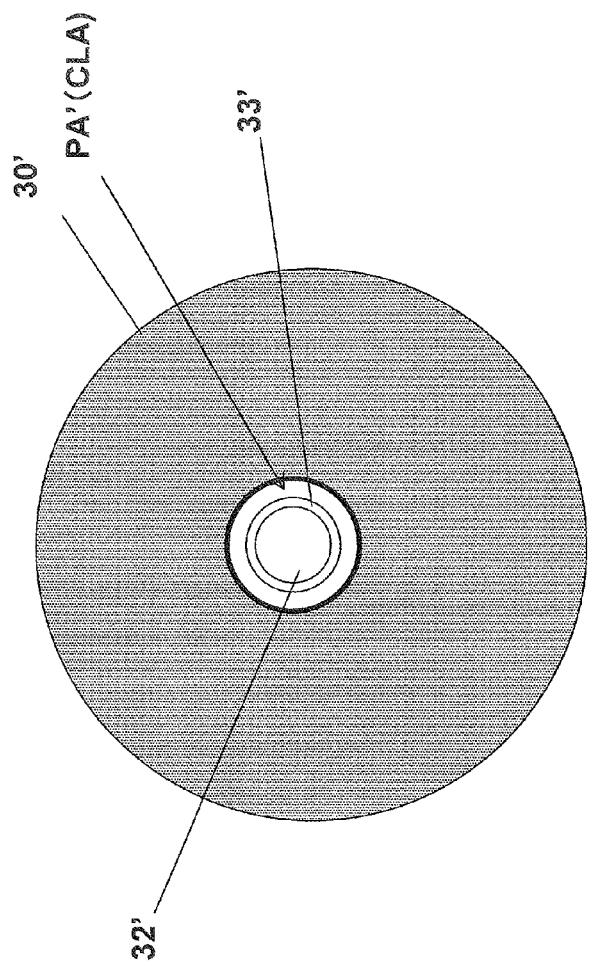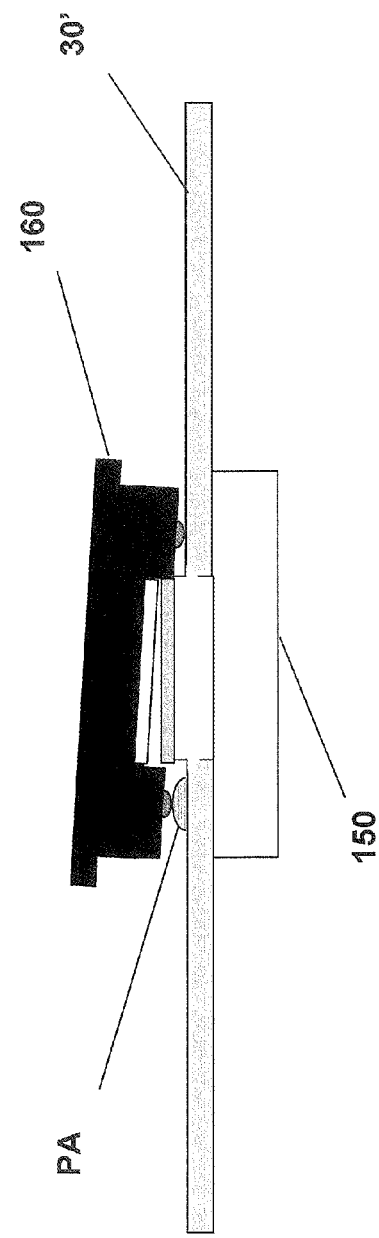
FIG. 12A
FIG. 12B ed at a center of the substrate, a thin portion formed so as to surround an outer diameter of the cylindrical portion, the thin portion being thinner than the predetermined thickness, a non-inclined surface formed at the thin portion, an inclined surface formed on an outer diameter side of the non-inclined surface at the thin portion, the inclined surface being inclined at a predetermined angle to the non-inclined surface, a concavo-convex area formed on an outer diameter side of the thin portion on one of the first side and the second side, a printing area formed in the concavo-convex area, and a data recording area formed on the other of the first side and the second side. The data recording area of one of the information recording medium is formed so as not to overlap the printing area of another one of the information recording medium when the one of the information recording medium is placed on the another one of the information recording medium.

DISK-SHAPED INFORMATION RECORDING MEDIUM, DISK CARTRIDGE, AND INFORMATION RECORDING/REPRODUCING APPARATUS

CROSS-REFERENCE TO RELATED APPLICATIONS

This application is a continuation application of U.S. patent application Ser. No. 13/960,814 filed Aug. 7, 2013, which claims priority under 35 U.S.C.§119 to Japanese Patent Applications No. 2012-177029 filed on Aug. 9, 2012 and No. 2013-135367 filed on Jun. 27, 2013. The entire disclosures of Japanese Patent Applications No. 2012-177029 and No. 2013-135367 are hereby incorporated herein by reference.

BACKGROUND

1. Technical Field

The disclosure relates to a recording medium onto which information is recorded. Particularly, it relates to a disk-shaped recording medium and a disk cartridge that stores a plurality of disk-shaped recording media in the stack.

2. Background

An optical disk is constituted by a substrate and a cylindrical portion forming a through hole at a center of the substrate. FIG. 15 shows a cross section of a known optical disk, as disclosed in Japanese Utility Model Laid-Open Publication No. H01-103022. A known optical disk has a cylindrical portion at its center and an outer side of the cylindrical portion is cut out. Another known optical disk has a label printing area on one side of the optical disk, as disclosed in Japanese Patent Laid-Open Publication No. H05-198015.

SUMMARY

There is a demand for increasing information storage capacities. As a type of high-capacity information storage, a disk cartridge storing a plurality of optical disks in the stack has been proposed. However, using a plurality of optical disks in a stack, each of which has the above-described structure, causes adhesion between disks, adherence of foreign particles (e.g. dust), and the like. As a result, the quality of an optical disk can deteriorate.

The disclosure provides a disk-shaped information recording medium that assures the quality of the information recording medium, even when the information recording medium is placed on another recording medium in use.

The information recording medium according to one aspect of the disclosure is a disk-shaped information recording medium having an outer diameter and an inner diameter. The information recording medium comprises a substrate with a predetermined thickness, a first side that is one side of the substrate, a second side that is the other side of the substrate, a cylindrical portion forming a through hole formed at a center of the substrate, a thin portion formed so as to surround an outer diameter of the cylindrical portion, the thin portion being thinner than the predetermined thickness, a non-inclined surface formed at the thin portion, and an inclined surface formed on an outer diameter side of the non-inclined surface at the thin portion, the inclined surface inclined at an angle greater than or equal to 25 degrees and less than or equal to 35 degrees with respect to the non-inclined surface.

The information recording medium according to another aspect of the disclosure is a disk-shaped information record- Accordingly, the disk-shaped information recording medium of this disclosure is capable of maintaining the quality of the disk-shaped information recording medium even when the information recording medium is placed on another recording medium in use.

BRIEF DESCRIPTION OF DRAWINGS

FIGS. 12A and 12B are diagrams for explaining the state in which an optical disk according to a comparative example is set in the information recording/reproducing apparatus.

DETAILED DESCRIPTION

Embodiments will be described in detail below with reference to the drawings as needed. Description that is more detailed than necessary may be omitted. For example, detailed description of things that are already known or redundant description of components that are substantially the same may be omitted. The purpose of this is to avoid making the following description overly repetitive, and to facilitate understanding for a person skilled in the art. It will be apparent to those skilled in the art from this disclosure that the following descriptions of the embodiments are provided for illustration only.

Furthermore, the inventors provide the appended drawings and the following description so that a person skilled in the art will fully understand what is disclosed herein, and do not intend thereby to limit the subject of what is discussed in the patent claims.

Unless otherwise specified, those symbols, labels, and numbers that are the same in this description indicate the same constituent elements. Also, unless otherwise specified, constituent elements that are not essential to the present invention may not be depicted.

Embodiment 1

Figure 1:
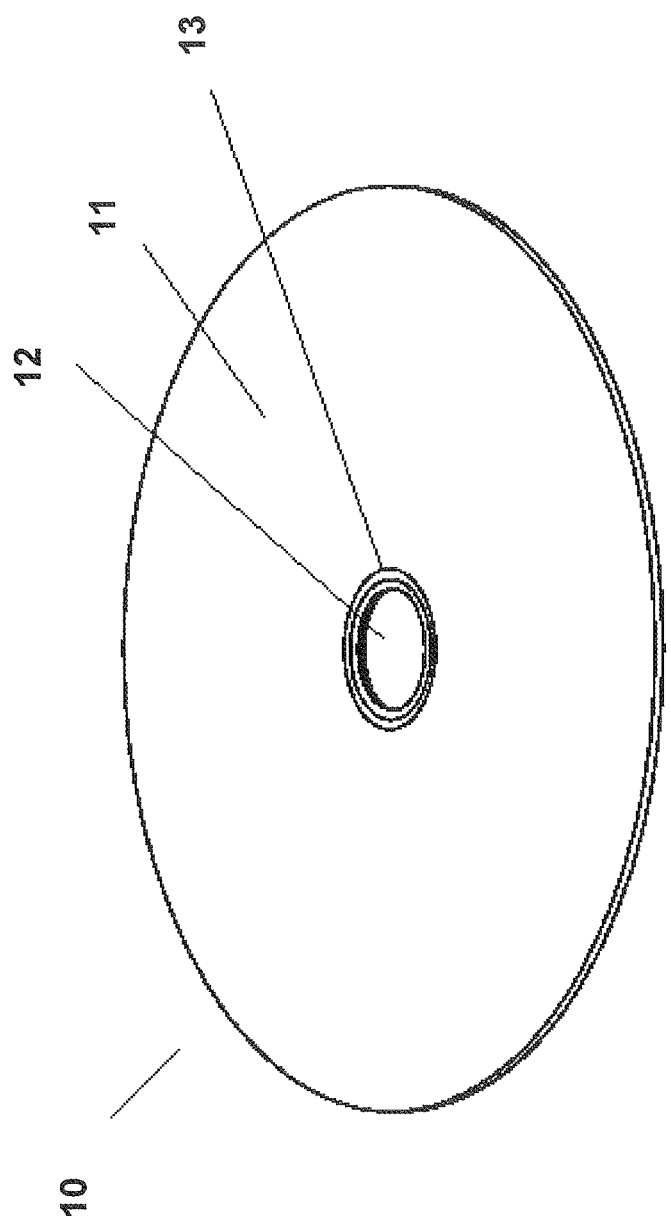
FIG. 1 is a perspective view of an optical disk according to Embodiment 1.
Figure 2:
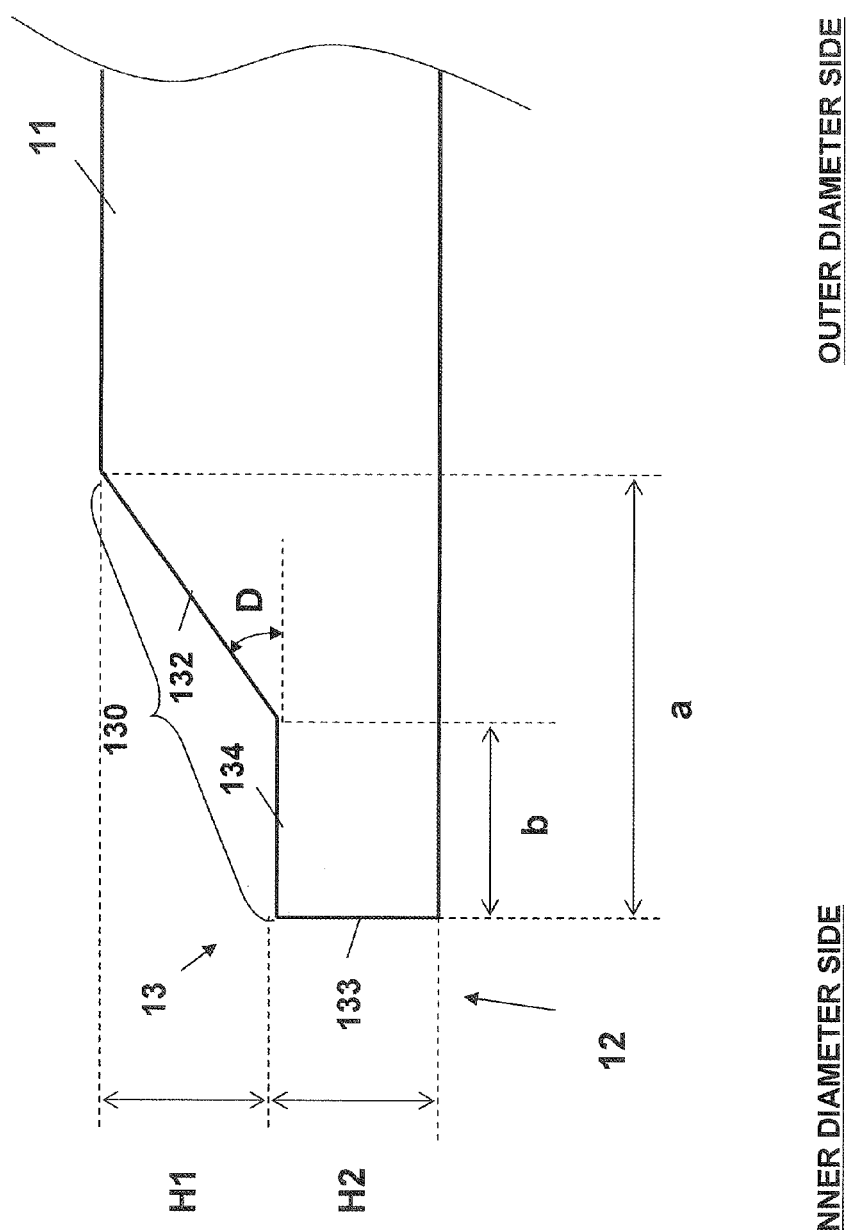
FIG. 2 is a cross sectional view of a central portion of the optical disk according to Embodiment 1.

Embodiment 1 will now be described below with reference to FIG. 1 to FIG. 7.
1-1. Configuration
1-1-1. Optical Disk FIG. 1 is a perspective view of the optical disk 10 (an example of a disk-shaped information recording medium) according to Embodiment 1. The optical disk 10 is an optical disk such as a Blu-ray Disk (BD), DVD, or CD. The optical disk 10 includes a substrate 11 (an example of a substrate) having a predetermined thickness and a central cylindrical portion 13 (an example of a cylindrical portion) that forms a through hole 12. The substrate 11 is formed by injection molding using transparent resin such as polycarbonate. The substrate 11 has a first side (an example of a first side) and a second side (an example of a second side). The first side of the substrate is formed with a label printing area. The second side of the substrate is formed with a recording layer for recording information. The through hole 12 is formed around a center of the substrate 11. Utilizing the through hole 12, the optical disk 10 is mounted onto a turntable 150, shown in FIG. 5 and FIG. 11, and described later. As shown in FIG. 2, a thin portion 130 (an example of a thin portion), that is thinner than the predetermined thickness of the substrate 11, is formed on an outer diameter side of the central cylindrical portion 13 on the first side of the substrate 11. The thin portion 130 in this Embodiment is formed on the first side of the substrate 11, that is, a side having no recording layer for recording information.

FIG. 2 is a cross sectional view of the substrate 11 illustrating the thin portion 130, formed on an outer diameter side of the central cylindrical portion 13, according to Embodiment 1. The thin portion 130 has a horizontal surface 134 (an example of a non-inclined surface), an inclined surface 132 (an example of an inclined surface) formed continuously to the horizontal surface 134, and a vertical surface 133 (an example of a vertical surface or a non-inclined surface) formed continuously to an inner diameter side of the horizontal surface 134. The horizontal surface 134 has the length "b" from the outer diameter of the through hole 12. The horizontal surface 134 extends in parallel to a level of the side of the substrate 11 where the thin portion 130 is not formed (that is, the second side or the bottom side of the substrate 11 shown in FIG. 2). The inclined surface 132 has an angle D so as to be inclined at approximately 30 degrees (preferably between 25 degrees and 35 degrees) to the horizontal surface 134. Consequently, the substrate 11 is configured to have a cutout on the outer diameter side of the central cylindrical portion 13. The vertical surface 133 is formed continuously to the horizontal surface 134 and along the outer diameter of the central cylindrical portion 13 that is an outer diameter of the through hole 12.

The following is a relation between the length "b" and the length "a". The length "b" runs from the outer diameter of the central cylindrical portion 13 to an inner edge of the inclined surface 132, which is equivalent to a length of the horizontal surface 134. The length "a" runs from the outer diameter of the central cylindrical portion 13 to an outer edge of the inclined surface 132, which is equivalent to a length of the thin portion 130.

$$b < a - b$$

In other words, the inclined surface 132 is formed larger than the horizontal surface 134 in the thin portion 130.

Moreover, the length "b" is determined so that the height H1, from the horizontal surface 134 to a level of the first side of the substrate 11 (that is, an upper surface of the substrate 11 shown in FIG. 2), is approximately equal to the height H2, from a level of the second side of the substrate 11 to the horizontal surface 134. The length "b" is 0.4 mm in Embodiment 1. With the configuration, the optical disk 10 is capable of maintaining a certain strength of the substrate 11 while securing a space formed by the thin portion 130.

In Embodiment 1, the inclined surface 132 is formed so as to be inclined at about 30 degrees to the horizontal surface 134, the horizontal surface 134 being parallel to the level of the second side of the substrate 11. However, the inclination angle may be any angle between 5 degrees and 55 degrees.

1-1-2. Disk Cartridge

Figure 3:
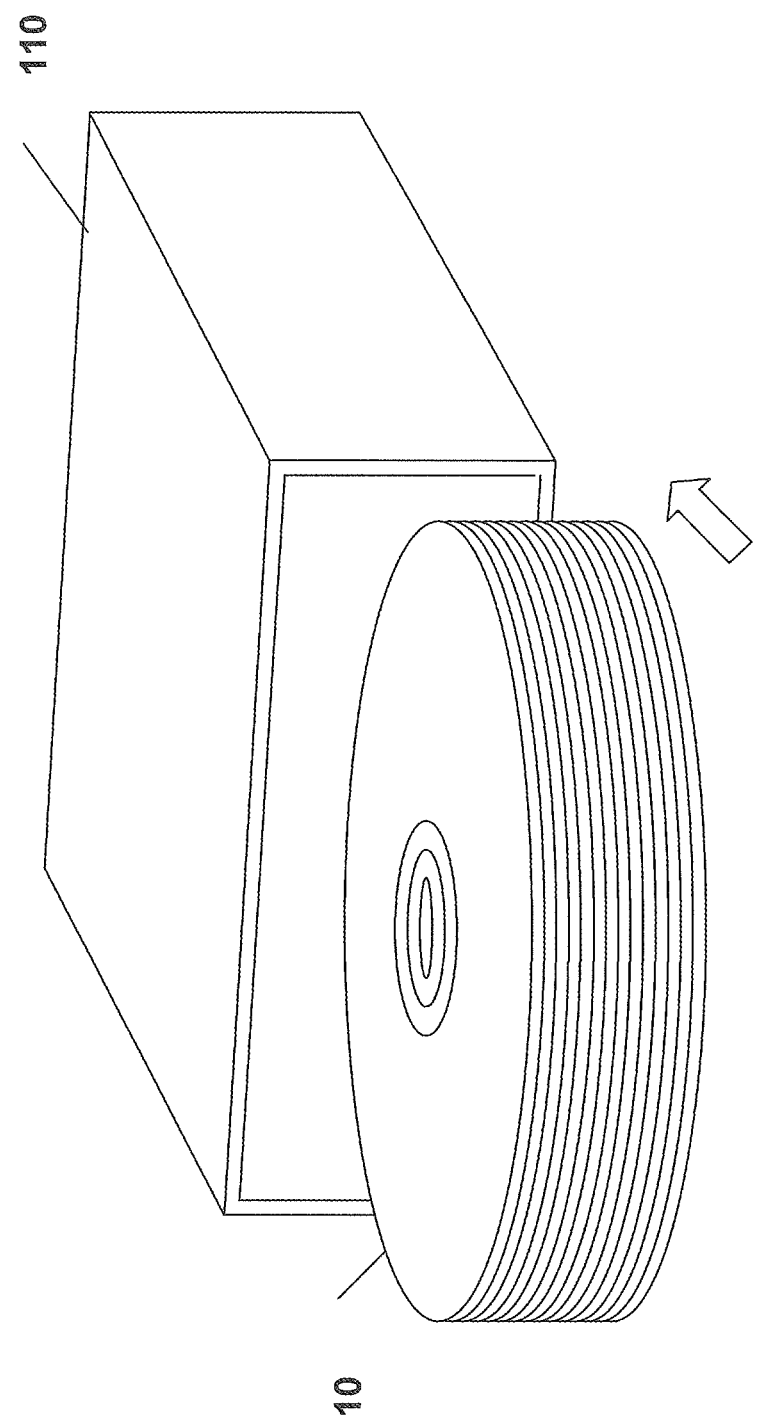
FIG. 3 is a perspective view of a stack of optical disks stored in a disk cartridge according to Embodiment 1.

FIG. 3 shows a disk cartridge 110 (an example of a disk cartridge) having a case in which a plurality of optical disks 10 are stored in the stack.

The disk cartridge 110 storing the stack of optical disks 10 is set in the information recording/reproducing apparatus 100 (FIG. 5), which will be described later.

Figure 4:
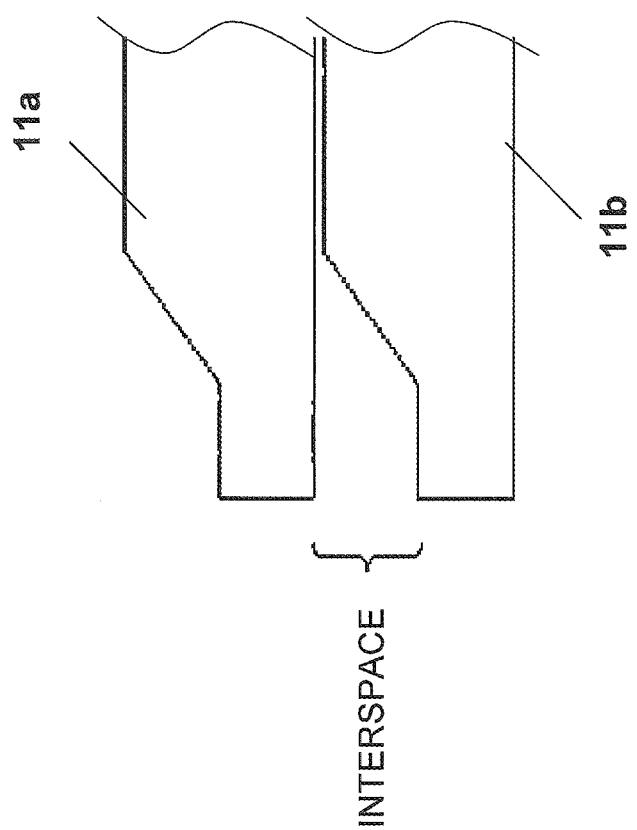
FIG. 4 is a cross sectional view of the optical disks stacked on top of another according to Embodiment 1.

FIG. 4 shows the state of optical disks 10 stacked one on top of another, in which 11a designates the substrate of an upper optical disk and 11b designates the substrate of a lower optical disk. The optical disk 10, according to Embodiment 1, is used in a disk cartridge 110 that stores plural optical disks stacked one on top of another. The disk cartridge 110 is used as a high-capacity recording medium of a cartridge type. In FIG. 4, substrates of only two optical disks (11a and 11b) in the stack are shown for easy understanding. However, the disk cartridge 110 may include more than two optical disks.

1-1-3. Information Recording/Reproducing Apparatus

Figure 5:
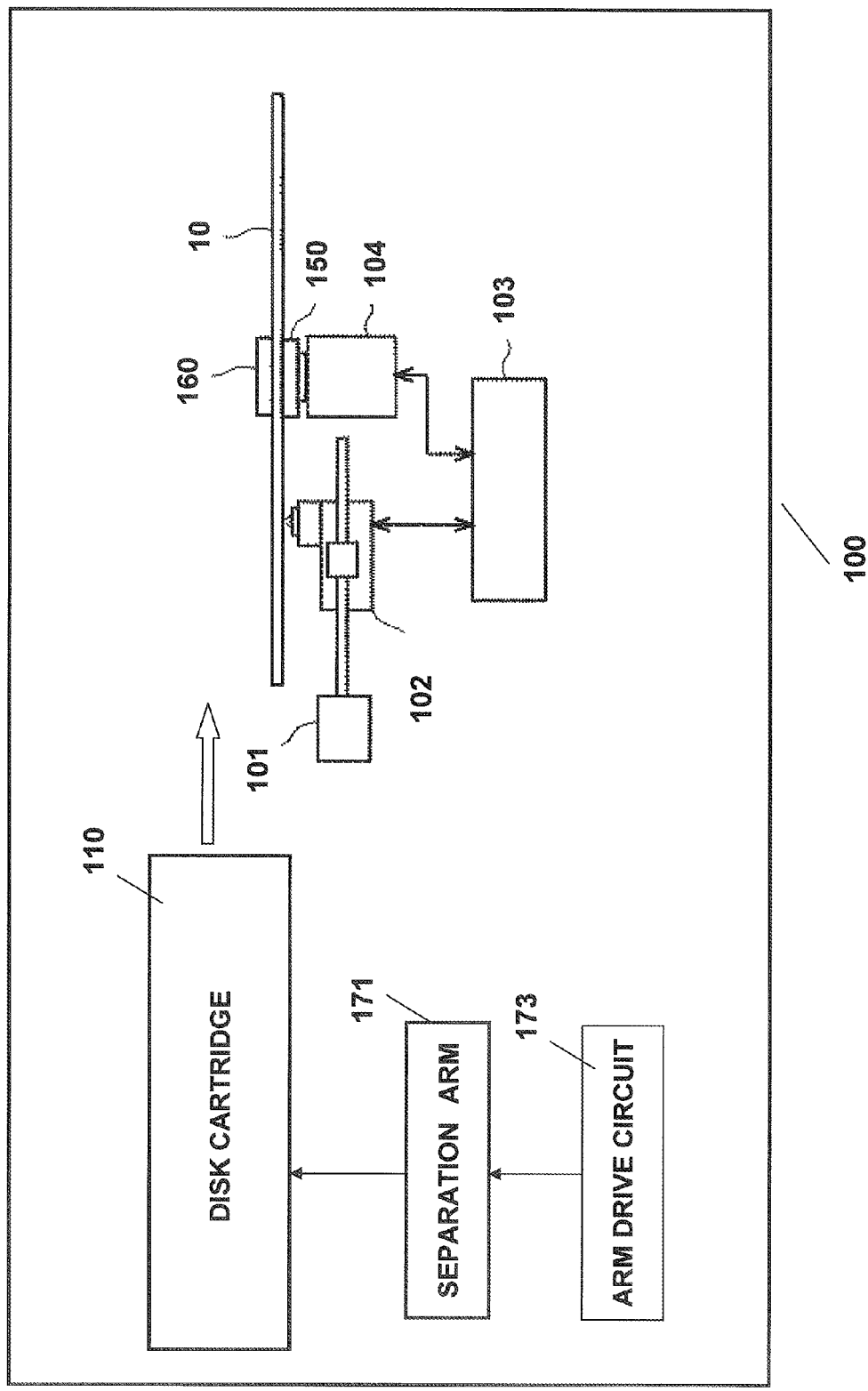
FIG. 5 is a diagram schematically showing a configuration of an information recording/reproducing apparatus for an optical disk.

FIG. 5 schematically shows a configuration of the information recording/reproducing apparatus 100 (an example of an information recording/reproducing apparatus) according to this Embodiment. The information recording/reproducing apparatus 100 includes an optical pickup drive 101, an optical pickup 102, a motor 104, a turntable 150, and a clamper 160. The information recording/reproducing apparatus 100 uses these elements when recording or reproducing information on, or from, the optical disk 10. The information recording/reproducing apparatus 100 also includes an electric circuit 103 (an example of an electric circuit) that controls the recording or reproducing of information on or from the optical disk 10. The information recording/reproducing apparatus 100 further includes a separation arm 171 and an arm drive circuit 173. The separation arm 171 removes an optical disk 10 from the disk cartridge 110. The arm drive circuit 173 drives the separation arm 171.

The optical pickup 102 is driven by the optical pickup drive 101. The optical pickup 102 sends the electric circuit 103 radio-frequency signals and signals for focusing, tracking, and gap controlling, according to a spatial relationship with the optical disk 10. In response to these signals, the electric circuit 103 sends the optical pickup 102 signals for driving an actuator for an objective lens. With these signals, the optical pickup 102 reads, writes or deletes information with respect to the optical disk 10, while performing focusing control, tracking control, gap control, and tilt control.

As described above, the disk cartridge 110 stores two or more optical disks 10 in the stack. Then, the disk cartridge 110 is set in the information recording/reproducing apparatus 100 via an operation of a user. The separation arm 171 removes one of the stacked optical disks 10 from the disk cartridge 110, under control of the arm drive circuit 173, and carries the removed optical disk 10 to a tray for mounting the optical disk 10 on the turntable 150. The removed optical disk 10 is then mounted onto the turntable 150, and ready for being subject to information writing or reading by the optical pickup 102.

1-2. Operation

Figure 6A:
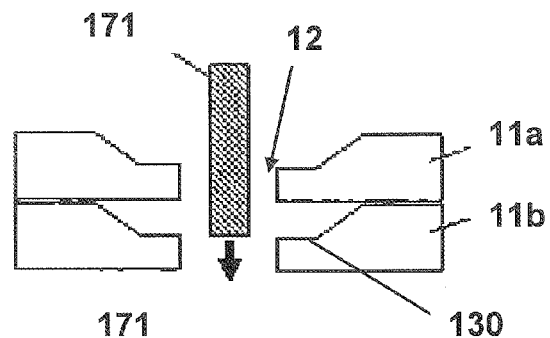
FIGS. 6A to 6F are diagrams for explaining a procedure for separating optical disks according to Embodiment 1.
Figure 6B:
Figure 6C:
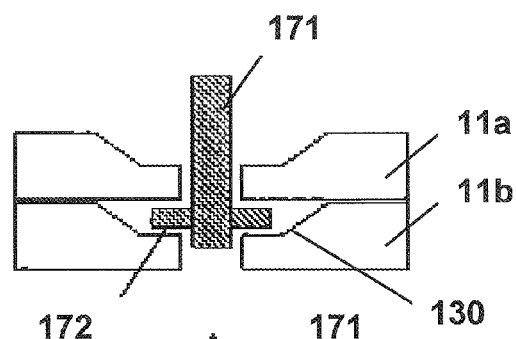
Figure 6D:
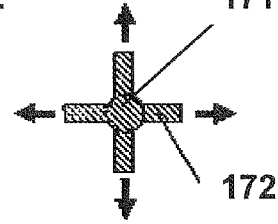
Figure 6E:
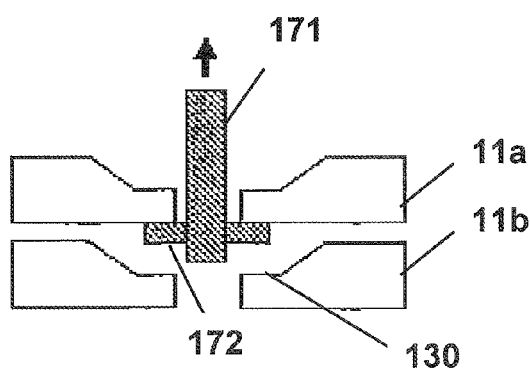
Figure 6F:
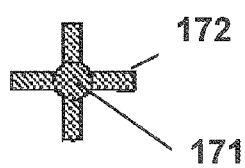

FIG. 6A to FIG. 6F are diagrams for explaining a procedure for separating the substrates 11a and 11b of the stacked optical disks according to Embodiment 1. The stacked substrates are separated via operation of the above-mentioned separation arm 171. FIG. 6A is a side view showing the state where the separation arm 171 is inserted in the through hole 12 at the center of the stacked substrates 11a and 11b. FIG. 6B is a top plan view of the separation arm 171 in the state shown in FIG. 6A. FIG. 6C is a side view showing the state where the stacked substrates 11a, 11b are about to be separated by the separation arm 171. FIG. 6D is a top plan view of the separation arm 171 in the state shown in FIG. 6C. FIG. 6E is a side view showing the state where the stacked substrates 11a, 11b have been separated by the separation arm 171. FIG. 6F is a top plan view of the separation arm 171 in the state shown in FIG. 6E.

As shown in FIG. 6A and FIG. 6B, the separation arm 171 comes down and passes through the through hole 12 of the upper substrate 11a, and then stops at a position just before passing the through hole 12 of the lower substrate 11b.

Then, as shown in FIG. 6C and FIG. 6D, four nails 172 arranged at intervals of about 90 degrees come out from the separation arm 171, and then extend into an interspace formed by the thin portion 130 forming a cutout at a center of the lower substrate 11b.

Thereafter, as shown in FIG. 6E and FIG. 6F, the separation arm 171 goes up while keeping the extended nails 172 and comes into contact with the bottom side or the second side of the upper substrate 11a where no cutout is formed. Then, the separation arm 171 goes up together with the upper substrate 11a held by the nails 172. As a result, the substrate 11a and the substrate 11b are separated from each other.

As discussed above, it is possible to separate substrates in the stack by utilizing the thin portion 130 formed at the center of the substrate. In order to separate substrates in a proper manner, it is also necessary to keep a sufficient space at the thin portion 130. However, foreign particles such as dust accumulated at the thin portion 130 prevent the nails 172 from holding the upper substrate 11a in a proper position, and this makes the operation of the separation arm 171 unstable, or may result in damaging the nails 172.

As described above, according to Embodiment 1, a method of separating substrates 11 of a plurality of stacked optical disks 10 each having a through hole 12 is provided. The method includes inserting the separation arm 171 through a through hole 12 of one of the substrates 11, pulling out the nails 172 from the separation arm 171 so that the nails 172 extend into a space between the upper substrate 11a and the lower substrate 11b, raising the separation arm 171, and then separating the stacked optical disks 10 from each other.

Figure 7:
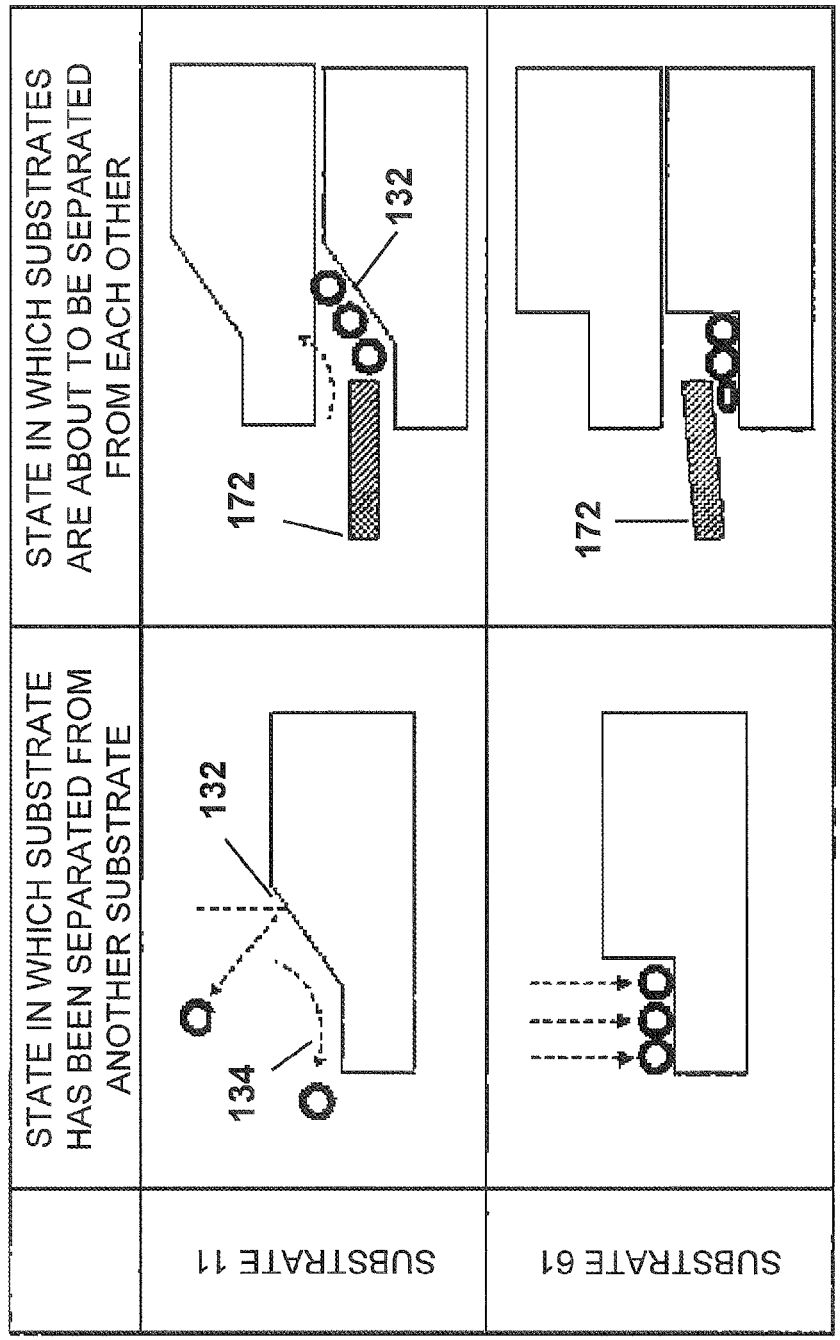
FIG. 7 is a diagram for explaining the state in which foreign particles have gotten in a thin portion around a central cylindrical portion of the optical disk according to Embodiment 1.

The following is a description on how the thin portion 130 of the substrate 11 is affected by foreign particles, which will be explained with reference to FIG. 7. FIG. 7 shows examples of how the substrate 11 according to this Embodiment, and the substrate 61 according to a comparative example, work in the state of being separated and in the state of being about to be separated. The substrate 11 is a substrate according to Embodiment 1, and the substrate 61 is a substrate according to a comparative example, the substrate 61 having a horizontal surface and a vertical surface with respect to the horizontal surface.

First, the state in which the substrate is separated will be explained.

The state in which the substrate is separated is a state in which there is only a single substrate. The substrate is in the state of being separated, for example, when the optical disk is being moved by the separation arm 171, or right after the optical disk is moved to a tray for guiding the optical disk to the turntable 150 (FIG. 4) and is then mounted on the turntable 150. Alternatively, the substrate may be in the state of being separated by removing the optical disk from the disk cartridge 110. Additionally, the substrate of the optical disk placed at the top of the stack is also deemed to be in the state of being separated.

In the case of the substrate 11 of the optical disk 10 of this Embodiment, foreign particles that have dropped onto the substrate 11 will bounce off the inclined surface 132 and move away from the substrate 11. Alternatively, the foreign particles may roll down the inclined surface 132 of the substrate 11, then roll on the horizontal surface 134 that is narrower than the inclined surface 132, and finally fall off the substrate 11. In other words, the inclined surface 132 of the substrate 11 makes it difficult for foreign particles to adhere to the substrate 11.

On the contrary, as in the case of the substrate 61 of the comparative example, foreign particles are likely to remain on the substrate 61 after having dropped onto the substrate 61.

Next, the state in which the substrate is about to be separated will be explained. The state in which the substrate is about to be separated is a state in which, in order to separate the stacked substrates, the nails 172 come out of the separation arm 171 and extend into a thin portion at a center of the substrate.

In the case of the substrate 11, of the optical disk 10 of this Embodiment, foreign particles on the inclined surface 132 will be subject to the force of the nails 172 in the horizontal direction, so that the foreign particles will be pushed up along the inclined surface 132 by the nails 172.

In the case of the substrate 61 of the comparative example, foreign particles on the substrate 61 will be moved along the horizontal surface by the nails 172 and stuck at the inner side of the horizontal surface. This causes the movement of the nails 172 to stop short, or to deflect in an unintended direction.

As discussed above, the inclined surface 132, of the substrate 11 according to this Embodiment, makes foreign particles move easily. As a result, foreign particles can be prevented from being stuck, and a smooth separation operation can be achieved. Furthermore, because the thin portion 130 includes the inclined surface 132, which is larger than the horizontal surface 134, foreign particles can easily fall into the through hole at the center to fall off the substrate 11.

As described above, with the inclined surface of the thin portion 130 formed at a center of the substrate 11, the optical disk 10 is capable of preventing foreign particles from adhering to and being stuck at the thin portion 130.

The above comparative example differs from Embodiment 1 in the configuration of the substrate of the optical disk. A method of separating stacked substrates for the comparative example is the same as the method of separating stacked substrates for Embodiment 1.

1-3. Effects, Etc.

As discussed above, the optical disk 10 according to this Embodiment includes the thin portion 130 formed on an outer diameter side of the through hole 12 at a center of the substrate 11, the thin portion 130 has the horizontal surface 134 and the inclined surface 132, and the inclined surface 132 is larger than the horizontal surface 134 in the thin portion 130. Therefore, foreign particles can be prevented from adhering to, or being stuck at, an inner diameter portion of the substrate 11, i.e., around the through hole 12, and the quality of the optical disk can be prevented from deteriorating.

Moreover, the disk cartridge 110, according to this Embodiment, stores two or more optical disks 10 in the stack. Each optical disk 10 has the thin portion 130 formed on the outer diameter side of the through hole 12 at the center of the substrate 11. Each thin portion 130 has the horizontal surface 134 and the inclined surface 132. Therefore, even in the case where the optical disks 10 are used in the stack inside the disk cartridge 110, the optical disks 10 can be separated in a proper manner. As a result, the optical disks are protected from being damaged, and their quality is maintained.

Embodiment 2

2-1. Configuration

Figure 8:
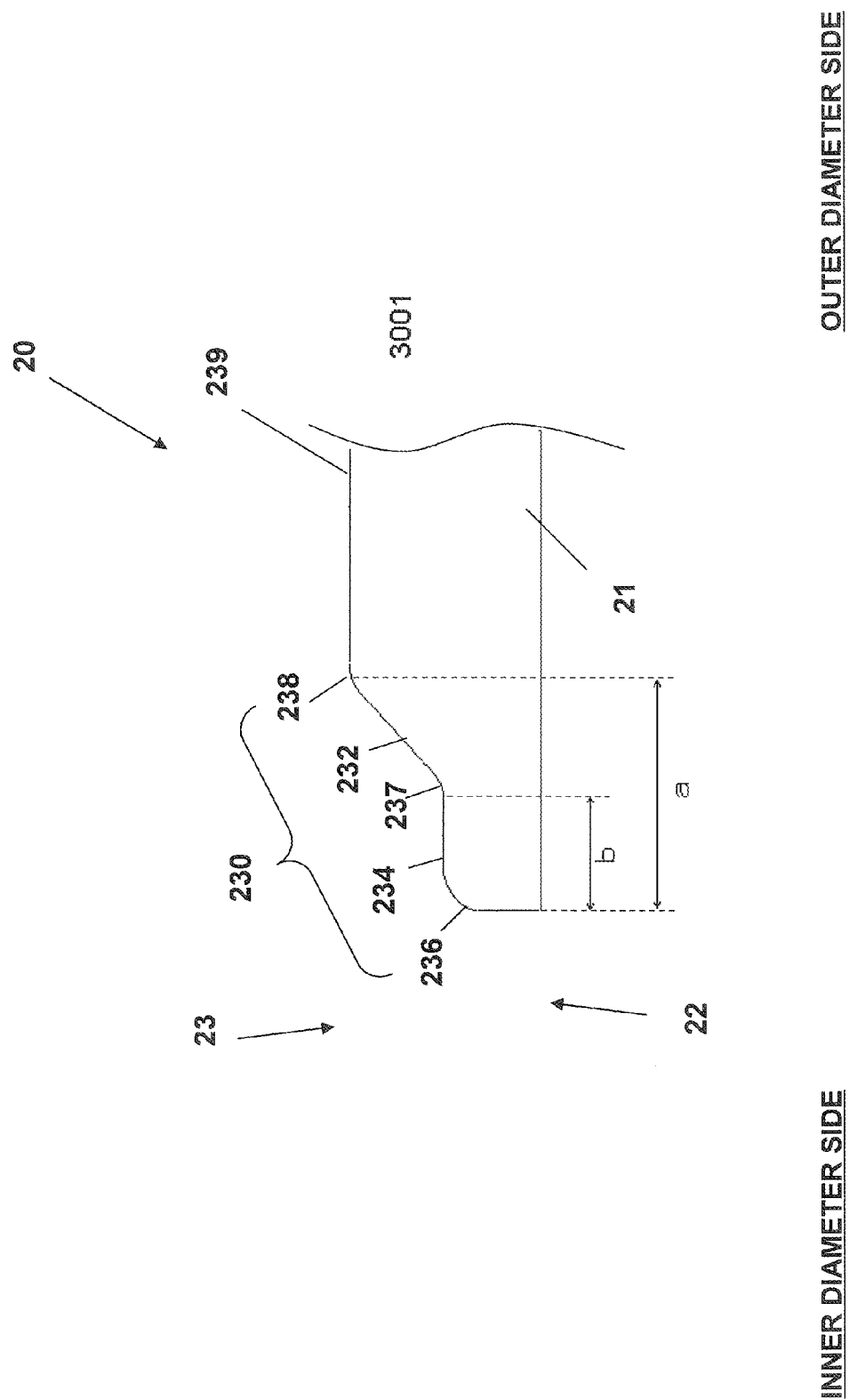
FIG. 8 is a cross sectional view of a central part of an optical disk according to Embodiment 2.

FIG. 8 is a cross sectional view of a substrate 21 (an example of a substrate) of an optical disk 20 (an example of a disk-shaped information recording medium) according to Embodiment 2. The optical disk 20 includes the substrate 21, and a central cylindrical portion 23 (an example of a cylindrical portion) that forms a through hole 22. The central cylindrical portion 23 is formed with a thin portion 230 (an example of a thin portion) on the first side of the substrate 21 (an upper side in FIG. 8), similarly to Embodiment 1. The optical disk 10 according to Embodiment 2 is different from the previously described Embodiment 1, in that the thin portion 230 of the substrate 21 includes three curvature portions 236, 237, 238 (an example of a curvature portion). The three curvature portions 236, 237, and 238 are in addition to a horizontal surface 234 (an example of a non-inclined surface) and an inclined surface 232 (an example of an inclined surface) formed continuously to the horizontal surface 234. Other parts or elements of the optical disk 20 are the same as those of the optical disk 10 of Embodiment 1.

The curvature portion 236 is formed between the horizontal surface 234, and a periphery of the through-hole 22, i.e. an outer diameter of the central cylindrical portion 23. The curvature portion 237 is formed between the horizontal surface 234 and the inclined surface 232. The curvature portion 238 is formed between the inclined surface 232 and the horizontal surface 239 that is a level of the first side of the substrate 21, i.e. a side where the thin portion 230 is not formed.

2-2. Effect, Etc.

As discussed above, according to the optical disk 20 of this Embodiment, the thin portion 230 formed at the center of the substrate 21 has curvature portions 236, 237, 238. With this configuration, in addition to the effects of Embodiment 1, foreign particles can be removed more effectively in such cases where the substrate 21 is in the state of being separated or in the state of being about to be separated as shown in FIG. 7. Particularly, with the curvature portion 236, foreign particles adhering to an inner diameter side of the horizontal surface 234 are likely to fall off the horizontal surface 234 and go through the through hole 22. With the curvature portion 237, foreign particles can roll down the inclined surface 232 smoothly to the horizontal surface 234 without slowing down, then roll on the horizontal surface 234, and finally come off the substrate 21 by going through the through hole 22. Furthermore, with the curvature portion 238, foreign particles are pushed up obliquely along the inclined surface 232 by the nails 172 (FIG. 6) of the separation arm 171 as they are being extended. As a result, the separation operation by the nails 172, as shown in FIG. 6, is not interfered with by foreign particles remaining on the substrate.

2-3. Modified Example

All of the above described curvature portions 236, 237, and 238 need not be included. For example, only one or two of the curvature portions 236, 237, and 238 may be formed.

Embodiment 3

3-1. Configuration 3-1-1. Optical Disk

Figure 9:
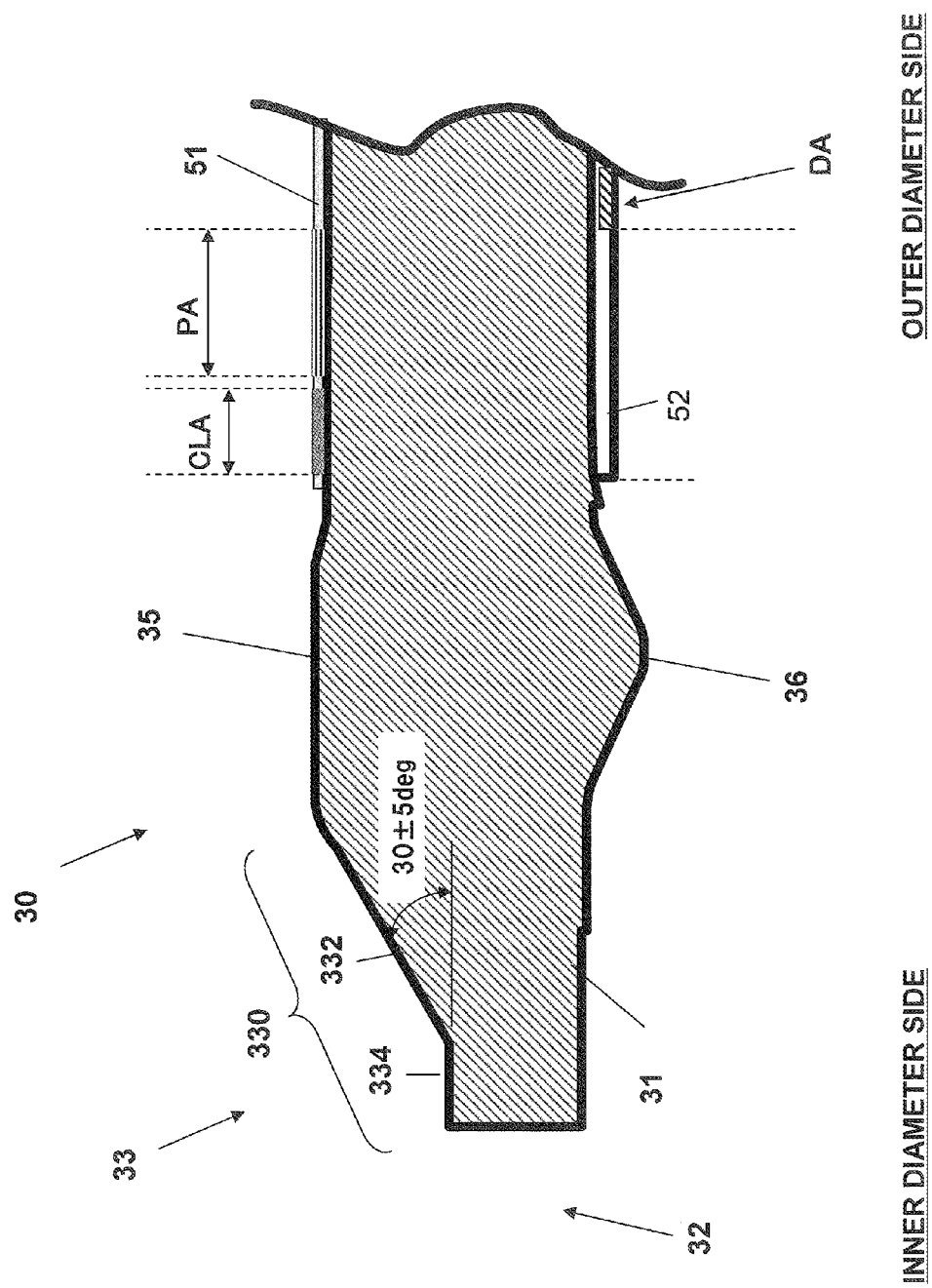
FIG. 9 is a cross sectional view of a central part of an optical disk according to Embodiment 3.

FIG. 9 is a cross sectional view of a substrate 31 (an example of a substrate) of an optical disk 30 (an example of a disk-shaped information recording medium) according to Embodiment 3. The optical disk 30 has a substrate 31 and a central cylindrical portion 33 (an example of a cylindrical portion) that forms a through hole 32. The central cylindrical portion 33 forms a thin portion 330 (an example of a thin portion) on the first side of the substrate 31 (an upper side in FIG. 9). The thin portion 330 has a horizontal surface 334 (an example of a non-inclined surface) and an inclined surface 332 (an example of an inclined surface) formed continuously to the horizontal surface 334. The optical disk 30 according to Embodiment 3 is different from the above Embodiments 1 and 2 in that it includes a first protuberance 35 (an example of a protuberance), a second protuberance 36 (an example of a protuberance), and a concavo-convex area 51 (an example of a concavo-convex area).

The first protuberance 35 is formed on an outer diameter side of the thin portion 330 and bulges from the first side of the substrate 31. The second protuberance 36 bulges from the second side of the substrate 31 (a lower side in FIG. 9) at a position opposite to the first protuberance 35. The second side is further formed with a cover layer 52 on an outer diameter side of the second protuberance 36. The cover layer 52 includes a data recording area DA (an example of a data recording area) where data is recorded or reproduced.

The concavo-convex area 51 is formed on an outer diameter side of the thin portion 330 and the first protuberance 35 on the first side that is a labeling side of the substrate 31 of the optical disk 30. The concavo-convex area 51 is formed by a printing method as described below.

The printing is performed according to a common practice using paste. The paste used in this Embodiment contains urethane resin and acrylic resin, the urethane resin 25 to 30% by weight, and the acrylic resin 70 to 75% by weight. The paste is applied through the printing method using a screen printing plate made of polyester, and then the applied paste is hardened by UV irradiation.

The urethane resin used here has a grain size distribution of 3.5 micrometers to 5.0 micrometers in average, which forms a concavo-convex shape. When two or more optical disks, with the size of each concave portion or convex portion being larger than 5 micrometers, are stacked on each other, an information recording side of an upper optical disk is pressed by concave and convex portions formed on an upper side of a lower optical disk. As a result, indentation is made on the information recording side, which harms the information recorded on the optical disk. Moreover, when Si resin is used for the concave and convex portions, some of such concave and convex portions may come off. For this reason, urethane resin is used for the concave and convex portions in this Embodiment.

Moreover, the concavo-convex area 51 is formed within a range of 45 millimeters from the center of the substrate 11, for example.

Next, characters are printed on the labeling side that is the first side of the substrate 31. In this Embodiment, characters are printed through the printing method. Characters are printed using the acrylic resin paste containing pigments. The printed characters are then hardened by UV irradiation. The order of the formation process and the printing process for the concavo-convex area 51 may be changed.

The concavo-convex area 51, formed as discussed above, provides a printing area PA (an example of a printing area) for printing the label of the optical disk 30 and a clamp area CLA. The label of the optical disk 30 is printed in a predetermined radius position. The clamp area CLA is an area to contact a clamper 160 which will be described later, as shown in FIG. 9. The information printed on the printing area PA is information such as a manufacturer's logo, a brand name of the optical disk, disk storage capacity, and other similar information related to the optical disk.

3-1-2. Position of Printing Area

Next is an explanation of a spatial relationship between the printing area PA on the concavo-convex area 51 on the first side and the data recording area DA on the second side, in the optical disk 30 according to Embodiment 3.

The printing area PA is formed on the above described concavo-convex area 51 on the first side of the substrate 31. The printing area PA on the first side of the substrate 31 is formed on an inner diameter side of the data recording area DA on the second side of the substrate 31 such that the printing area PA is at a different radial position from the data recording area DA. That is, the printing area PA is formed such that an outermost boundary of the printing area PA is located on an inner side of an inner diameter of the data recording area DA.

With the printing area PA and the data recording area DA thus formed, when two or more optical disks 30 are stacked one on top of another, the data recording area DA on the second side of an upper optical disk 30 does not overlap the printing area PA on the first side of a lower optical disk 30. The printing area PA is formed so that printed characters such as a logo protrude from the first side of the substrate 31. Therefore, when there is another optical disk placed on the substrate 31, a second side of the other upper optical disk adheres to the printed characters on the substrate 31. This causes a difficulty in separating optical disks and damages the data recording area DA. Such a problem can be solved by Embodiment 3 in which when optical disks are used in the stack, the data recording area DA of an upper optical disk does not overlap the printing area of a lower optical disk.

3-1-3. Positions of First Protuberance and Second Protuberance

The first protuberance 35 is formed on an inner diameter side of the above-described concavo-convex area 51 on the first side of the substrate 31 of the optical disk 30. When two or more optical disks are stacked one on top of another, the first protuberance 35 prevents the first side of the optical disk 30 from sticking to the second side of another optical disk placed on the optical disk 30. This makes it easy to separate the stacked optical disks, and prevents a data recording area of the other optical disk from being damaged due to sticking.

The second protuberance 36 is formed on an inner diameter side of the cover layer 52 on the second side. When two or more optical disks are stacked one on top of another, and the optical disk 30 is placed on another optical disk, the second protuberance 36 can prevent the second side of the optical disk 30 from sticking to the first side of the other optical disk. This makes it easy to separate optical disks in the stack, and prevents a data recording area of the optical disk 30 from being damaged due to sticking.

Although both the first protuberance 35 and the second protuberance 36 are formed on the substrate 31 of the optical disk 30, either one of the first protuberance 35 or the second protuberance 36 may singularly be formed.

When both the first protuberance 35 and the second protuberance 36 are formed, one protuberance may be formed with a more sharply-angled top than the other while the other is formed with an obtuse or flat top. This further makes it easier to separate optical disks in the stack and optical disks can be stacked on each other in a stable manner. In the example of FIG. 9, the top of the first protuberance 35 is formed flat, and the second protuberance 36 is formed with a more sharply-angled top.

3-1-4. Position of Clamp Area

Next is an explanation of a spatial relationship between the printing area PA and the clamp area CLA on the concavo-convex area 51 on the first side of the optical disk 30 according to this Embodiment.

The clamp area CLA is formed on the concavo-convex area 51 formed on the first side of the substrate 31, as described above, so as not to overlap the printing area PA. That is, as shown in FIG. 9, the outermost boundary of the clamp area CLA is formed on an inner diameter side of the innermost of the printing area PA.

The innermost boundary of the clamp area CLA is formed at the same position as the innermost boundary of the concavo-convex area 51, or formed on an outer diameter side of the innermost boundary of the concavo-convex area 51.

With such positioning of the clamp area CLA as described above, the following effects can be expected.

Figure 10A:
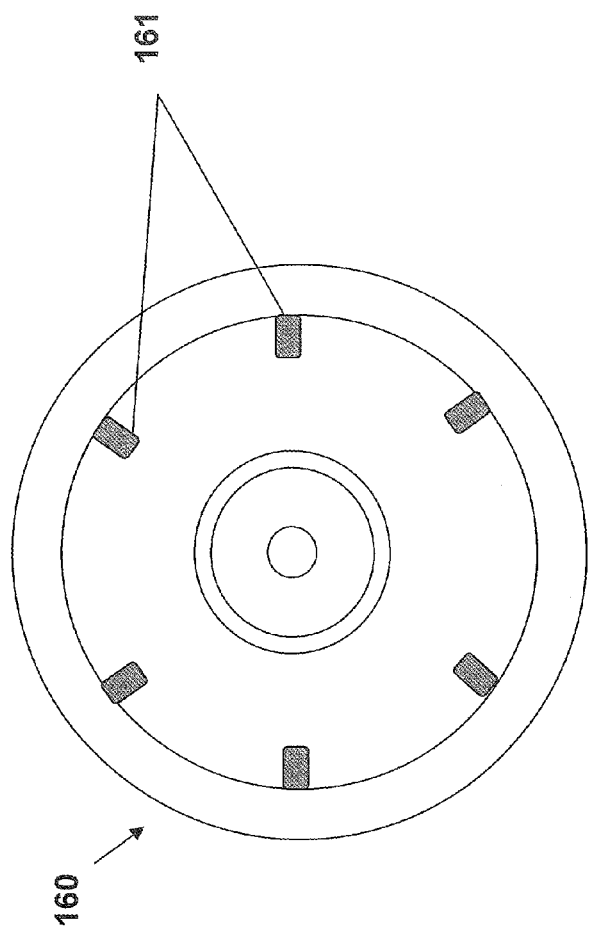
FIGS. 10A and 10B are views schematically showing a clamper in the information recording/reproducing apparatus for an optical disk.
Figure 10B:
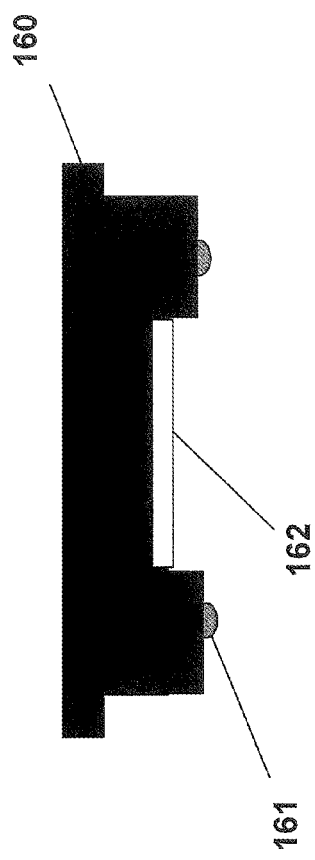

FIG. 10 schematically shows a configuration of the clamper 160 (FIG. 5) of the information recording/reproducing apparatus 100. FIG. 10A is a plan view of the clamper 160, and FIG. 10B is a cross sectional view of the clamper 160. As shown in FIG. 10A and FIG. 10B, the clamper 160 includes projections 161 and a metal portion 162.

Figure 11:
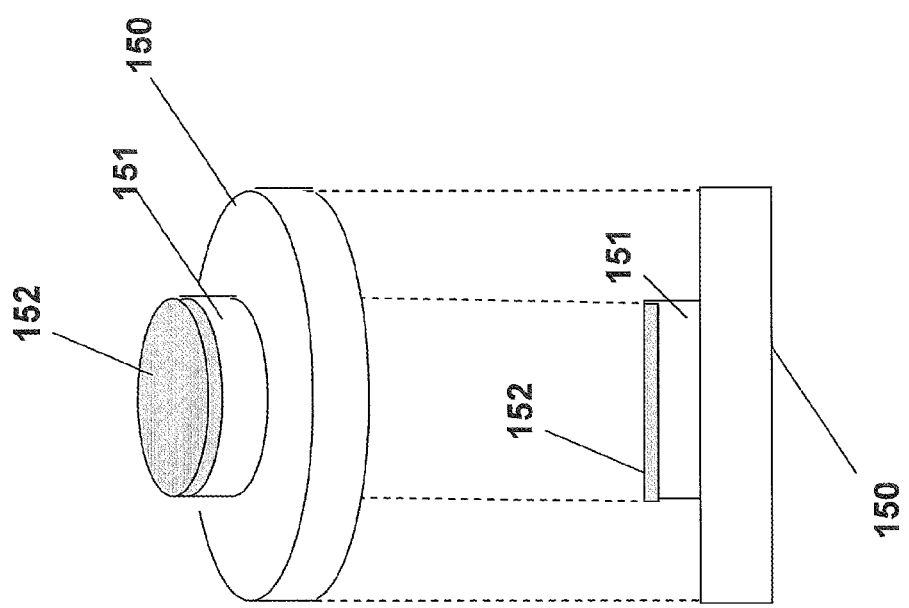
FIG. 11 is a view schematically showing a turntable in the information recording/reproducing apparatus for an optical disk.

FIG. 11 schematically shows a configuration of the turntable 150 (FIG. 5) of the information recording/reproducing apparatus 100. As shown in the figure, the turntable 150 includes a central projecting part 151 for holding the central cylindrical portion of an optical disk thereon, and a magnet portion 152 provided on a top of the central projecting part 151.

When information is to be recorded on or reproduced from the optical disk 30, the optical disk 30 is moved to the top of the turntable 150. From this position, the optical disk 30 is mounted on the turntable 150 by insertion of the central projecting part 151 of the turntable 150 into the through hole 32 at the center of the optical disk 30. The clamper 160 descends, and the optical disk 30 is then clamped between the clamper 160 and the turntable 150. At this point, the metal portion 162 of the clamper 160 and the magnet portion 152 of the turntable 150 attract and adhere to each other, thereby fixing the position of the optical disk 30. Information is then recorded on or reproduced from the optical disk 30 while the turntable 150 is rotated by a motor 104.

At this point, the projections 161 of the clamper 160 contact with the clamp area CLA formed on an outer diameter side of the cylindrical portion 33 of the optical disk 30. As previously discussed, the outer diameter side of the cylindrical portion 33 of the optical disk 30 is formed with the printing area PA.

FIG. 12 shows an example of an optical disk 30' having a printing area PA on a clamp area CLA. FIG. 12A shows a plan view of the optical disk 30' in which a printing area PA' is formed on an outer diameter side of the central cylindrical portion 33'. The outer diameter side of the central cylindrical portion 33' forms a central through hole 32' and the printing area PA' is formed in the clamp area CLA. FIG. 12B shows a state in which the optical disk 30', of FIG. 12A, is on the turntable 150 and is clamped by the clamper 160. As shown in FIG. 12, printed characters at the printing area PA bulge from the first side of the optical disk 30'. Therefore, when the projections 161 of the clamper 160 come into contact with the bulging printed characters on the optical disk 30', the projections 161 are lifted up by the bulging printed characters. This makes the position of the optical disk on the turntable 150 unstable.

Figure 13A:
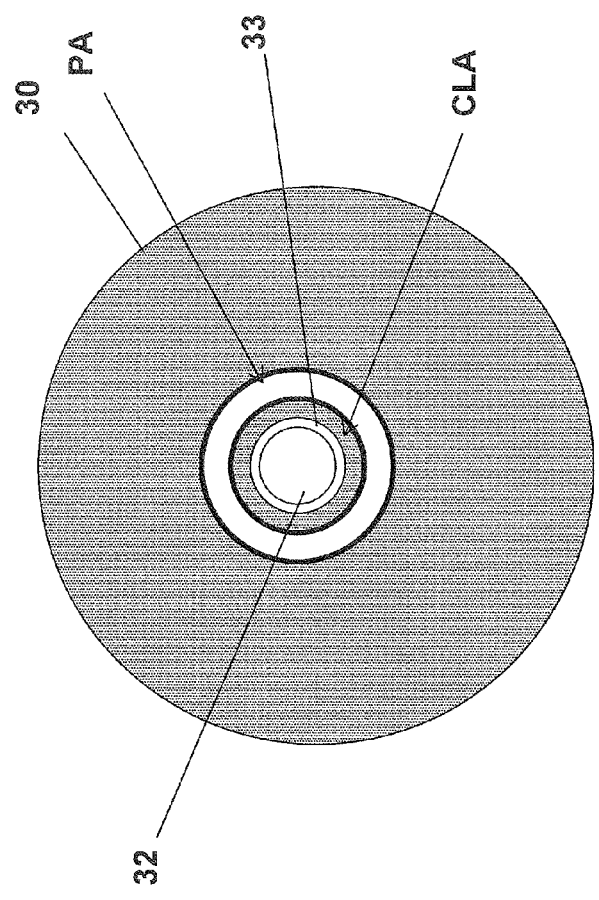
FIGS. 13A and 13B are diagrams for explaining the state in which the optical disk according to Embodiment 3 is set in the information recording/reproducing apparatus.
Figure 13B:
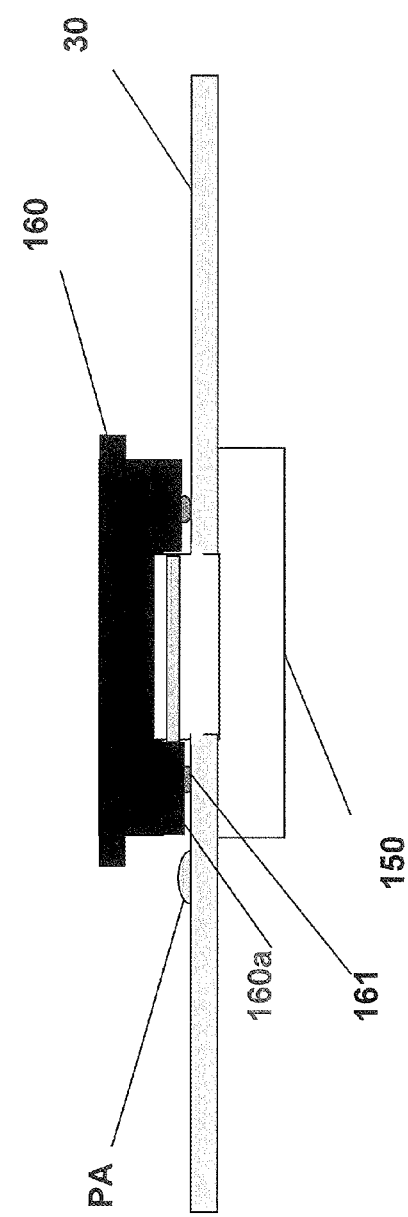

FIG. 13 shows an example of the optical disk 30 according to Embodiment 3. FIG. 13A is a plan view of the optical disk 30 having a clamp area CLA on an outer diameter side of the central cylindrical portion 33 forming a central through hole 32, and a printing area PA on an outer diameter side of the clamp area CLA such that the clamp area CLA does not overlap the printing area PA. FIG. 13B shows a state in which the optical disk 30 shown in FIG. 13A is on the turntable 150 and clamped by the clamper 160. As shown in the figure, the clamp area CLA is formed on an inner diameter side of the printing area PA such that the clamp area CLA does not overlap the printing area PA. As a result, the printing area PA is prevented from contacting and uplifting the clamper 160, and therefore, the optical disk 30 on the turntable 150 can be positioned in a stable manner.

The clamp area CLA may be an area of the optical disk 30 which the projections 161 of the clamper 160 contact. Alternatively, the clamp area CLA may be all the area that not only the projections 161 contact but also a lower surface 160a of the clamper 160 having the projections 161 face, as shown in FIG. 13B.

3-2. Effects, Etc.

As discussed above, the optical disk 30 according to Embodiment 3 has the concavo-convex area 51 formed on an outer diameter side of the thin portion 330 formed centrally on the first side of the substrate 31. Therefore, in addition to the effects of the above-described Embodiments 1 and 2, even when the optical disks 30 are used in the stack, the optical disks 30 can be prevented from sticking to each other and are therefore easy to be separated.

Furthermore, the optical disk 30 according to Embodiment 3 has a data recording area DA formed on the second side of the substrate 31 and a printing area PA formed in the concavo-convex area 51 on the first side. Thus, according to Embodiment 3, the optical disk is formed such that the printing area PA is at a different radial position from the data recording area DA. Therefore, even when plural optical disks 30 are stacked one on top of another, the data recording area DA of an upper optical disk 30 does not contact the printing area PA of a lower optical disk 30. This makes it easy to separate optical disks and prevents the data recording area DA of the optical disk 30 from being damaged by adhesion to the concavo-convex area 51.

Furthermore, the optical disk 30 according to Embodiment 3 has the clamp area CLA formed on the first side of the substrate 31 so as not to overlap the printing area PA. Therefore, the optical disk 30 can be set in the information recording/reproducing apparatus 100 in a stable manner.

3-3. Modified Example

The clamp area CLA may be formed on an outer diameter side of the printing area PA so as not to overlap the printing area PA, according to a configuration of the clamper.

Other Embodiments (1)

In the optical disk according to the above Embodiments, the thin portion formed at a center of the substrate has a horizontal surface and an inclined surface, the inclined surface larger than the horizontal surface. Alternatively, the thin portion may be formed with a horizontal surface and an inclined surface that is equal in size to or smaller than the horizontal surface.

(2)

A configuration of the thin portion formed at the center of the substrate of the optical disk should not be limited to the configuration in the above-described Embodiments. For example, the thin portion as follows will have the same effects as the above-described Embodiments.

Figure 14C:
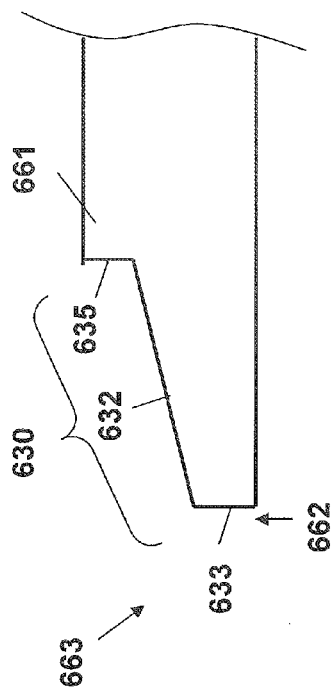
FIGS. 14A to 14D are cross sectional views showing central parts of optical disks according to other embodiments.
Figure 14D:
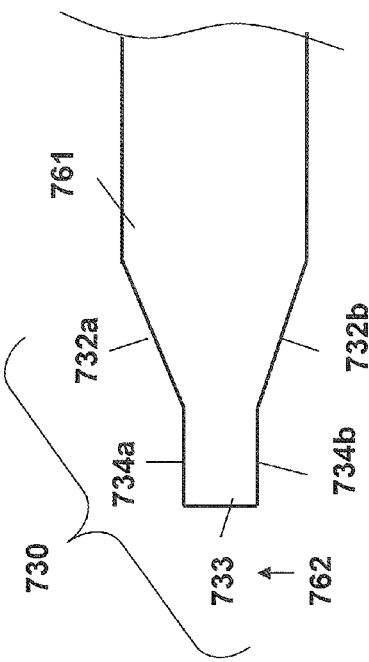
Figure 14A:
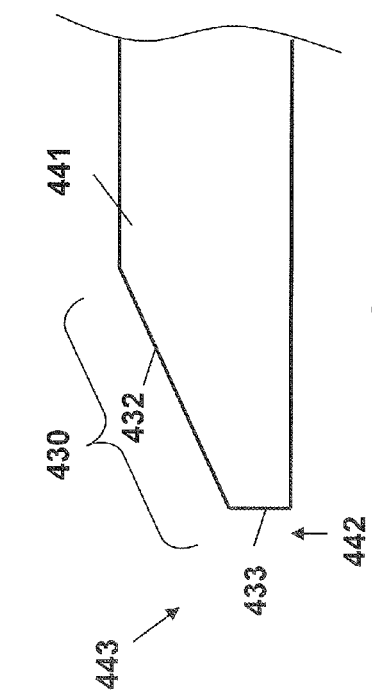

As cross-sectionally shown in FIG. 14A, the thin portion 430 formed at the center of the substrate 441 is formed with an inclined surface 432 (an example of an inclined surface) inclined at a predetermined angle, and a vertical surface 433 (an example of a non-inclined surface) formed continuously to an inner diameter of the inclined surface 432 and along an outer diameter of the central cylindrical portion 443, i.e. an outer diameter of the through hole 442.

Figure 14B:
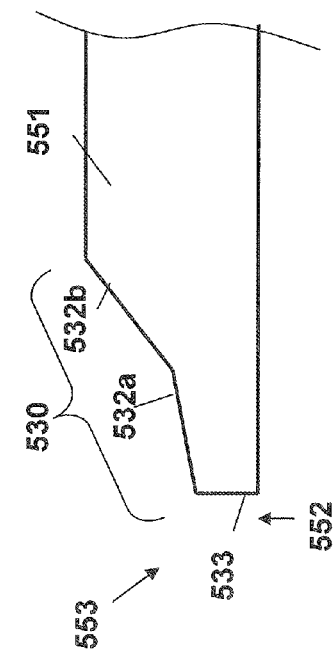
Figure 15:
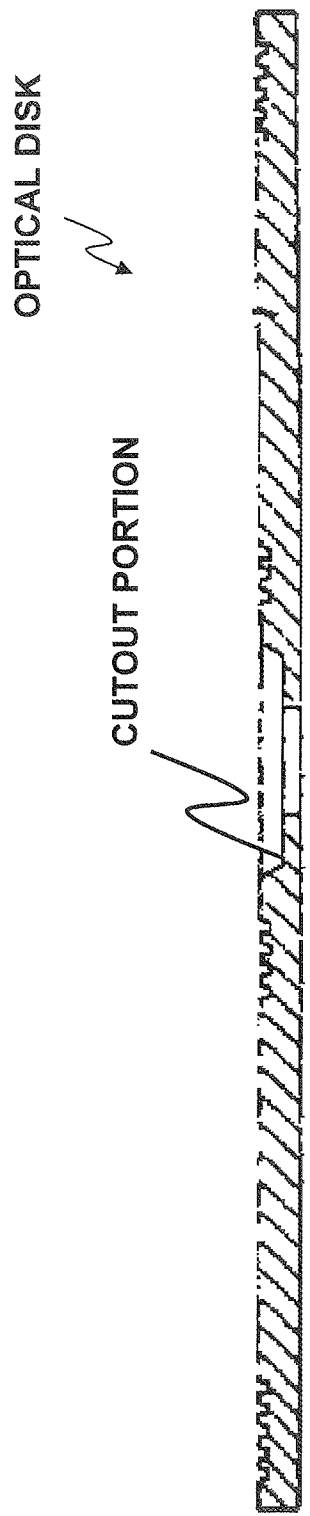
FIG. 15 is a cross sectional view of a known optical disk.

As cross-sectionally shown in FIG. 14B, the thin portion 530 formed at the center of the substrate 551 is formed with inclined surfaces 532a, 532b (examples of inclined surfaces) inclined at different angles, and a vertical surface 533 (an example of a non-inclined surface) formed continuously to an inner diameter of the inclined surface 532a and along an outer diameter of the central cylindrical portion 553, i.e. an outer diameter of the through hole 552.

In FIG. 14B, the thin portion 530 may also be described as including an inclined surface 532a (an example of a third surface) and an inclined surface 532b (an example of a fourth surface), in which the inclined surface 532a and the inclined surface 532b are inclined at different angles.

Alternatively, as cross-sectionally shown in FIG. 14C, the thin portion 630 formed at the center of the substrate 661 is formed with an inclined surface 632 (an example of an inclined surface) inclined at a predetermined angle, a vertical surface 633 (an example of a non-inclined surface) formed continuously to an inner diameter of the inclined surface 632 and along an outer diameter of the central cylindrical portion 663, i.e. an outer diameter of the through hole 662, and a vertical surface 635 (*an* example of a non-inclined surface) formed continuously to an outer diameter of the inclined surface 632 and extending vertically from the inclined surface 632 to a level of the first side of the substrate 661.

(3)

In the above-described Embodiment, the thin portion of the substrate of the optical disk is formed by reducing the thickness at a center of the first side of the substrate. Alternatively, the thin portion may be formed on the second side of the substrate, with which the optical disk will have the same effects. Furthermore, a two-sided optical disk as cross-sectionally shown in FIG. 14D will have the same effects as those of the above-described Embodiments. Particularly, the two-sided optical disk has a thin portion 730 formed on both sides of the center of the substrate 730. The thin portion 730 includes inclined surfaces 732a, 732b and non-inclined surfaces 734a, 734b at the both sides of the thin portion respectively, and a through hole 762 formed by a vertical surface 733 that is an inner diameter of the thin portion 730 and formed at a center in the thickness direction of the substrate 761.

(4)

In the above-described Embodiment, an optical disk is given as an example of the disk-shaped information recording medium. However the example should not be limited to an optical disk. As far as it is a disk-shaped information recording medium, any medium such as a magnetic disk or a magnetic optical disk may be applied.

(5)

The above-described Embodiments are given as examples of the technique disclosed herein. The accompanying drawings and detailed description thereof are provided only for describing the Embodiments. Accordingly, the constituent elements shown in the accompanying drawings and described in the detailed description may include not only those necessary for solving the technical problems but also those that are not essential for solving the technical problems and only given for illustrating the technique. Therefore, the constituent elements should not be considered as essential elements only because they are shown in the drawings and described in the detailed description.

The foregoing descriptions of the Embodiments are provided for illustration only, and therefore, various changes, substitution, addition, omission or the like can be made herein without departing from the scope as defined by the appended claims and their equivalents.

The disclosed technique may be applied to a disk-shaped information recording medium and an information recording/reproducing apparatus for the disk-shaped information recording medium.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the disk-shaped information recording medium, disk cartridge, and information recording/reproducing apparatus. Accordingly, these terms, as utilized to describe the technology disclosed herein should be interpreted relative to the disk-shaped information recording medium, disk cartridge, and information recording/reproducing apparatus.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A disk-shaped information recording medium having an outer diameter and an inner diameter, the information recording medium comprising:
   a substrate having a predetermined thickness;
   a first side that is one side of the substrate;
   a second side that is the other side of the substrate;
   a cylindrical portion forming a through hole formed at a center of the substrate;
   a thin portion formed so as to surround an outer diameter of the cylindrical portion, the thin portion being thinner than the predetermined thickness;
   a non-inclined surface formed at the thin portion; and
   an inclined surface formed on an outer diameter side of the non-inclined surface at the thin portion, the inclined surface inclined at an angle greater than or equal to 25 degrees and less than or equal to 35 degrees with respect to the non-inclined surface.

2. The disk-shaped information recording medium according to claim 1, further comprising a curvature portion formed between the non-inclined surface and the inclined surface.

3. The disk-shaped information recording medium according to claim 1, further comprising a curvature portion formed between the inclined surface and a surface of the substrate where the thin portion is not formed.

4. The disk-shaped information recording medium according to claim 1, further comprising a protuberance formed on an outer diameter side of the thin portion on at least one of the first side and the second side, the protuberance bulging from the at least one of the first side and the second side.

5. The disk-shaped information recording medium according to claim 1, further comprising a concavo-convex area formed on an outer diameter side of the thin portion on either one of the first side or the second side.

6. The disk-shaped information recording medium according to claim 5, further comprising:
   a data recording area formed on the other one of the first side or the second side; and a printing area formed in the concavo-convex area such that the printing area is at a different radial position from the data recording area in the information recording medium.

7. The disk-shaped information recording medium according to claim 5, wherein a diameter of each convex portion or each concave portion in the concavo-convex area is within 3.5 micrometers to 5.0 micrometers.

8. The disk-shaped information recording medium according to claim 5, wherein the concavo-convex area contains urethane resin.

9. The disk-shaped information recording medium according to claim 5, wherein the concavo-convex area is formed within a range of 45 millimeters from the center of the substrate.

10. The disk-shaped information recording medium according to claim 1, further comprising:
   a concavo-convex area formed on an outer diameter side of the thin portion on either one of the first side or the second side;
   a printing area formed in the concavo-convex area; and
   an area formed on an inner diameter side or an outer diameter side of the printing area in the concavo-convex area, the area being contacted by a clamper when information is recorded on or reproduced from the information recording medium.

11. A disk cartridge-comprising:
   a plurality of the disk-shaped information recording media according to claim 1; and
   a case that stores the plurality of the disk-shaped information recording media stacked one on top of another.

12. An information recording/reproducing apparatus, comprising:
   the disk cartridge according to claim 11;
   a mechanism configured to remove one of the disk-shaped information recording media from the disk cartridge;
   a mechanism configured to record or reproduce information on or from the removed one of the disk-shaped information recording media;
   an electric circuit configured to control the recording or reproducing of information on or from the removed one of the disk-shaped information recording media.

* * * * *